United States Patent [19]
Hayashida

[11] Patent Number: 5,594,316
[45] Date of Patent: Jan. 14, 1997

[54] POWER SUPPLY DEVICE FOR CONTROLLING AUTOMATIC DOOR

[75] Inventor: Tatekazu Hayashida, Kanagawa, Japan

[73] Assignee: Tsuden Kabushiki Kaisha, Kanagawa, Japan

[21] Appl. No.: 258,988

[22] Filed: Jun. 13, 1994

[51] Int. Cl.⁶ .................................. H02T 7/00; E06B 3/42
[52] U.S. Cl. .................................................. 320/2; 49/370
[58] Field of Search ........................... 49/280, 360, 370; 320/2; 187/290, 316, 410

[56] References Cited

U.S. PATENT DOCUMENTS

| | | |
|---|---|---|
| 4,698,876 | 10/1987 | Karita . |
| 4,983,963 | 1/1991 | Hodgetts et al. ................ 49/360 |
| 5,157,319 | 10/1992 | Klontz ............................ 320/2 |
| 5,239,779 | 8/1993 | DeLand et al. ................... 49/360 |

*Primary Examiner*—Peter S. Wong
*Assistant Examiner*—Patrick B. Law
*Attorney, Agent, or Firm*—Richard Linn

[57] ABSTRACT

In order to realize a power supply device for a sensor which can be used for a long time without any wire linking an outside power source and a movable door so as to supply an electric power, an outside power source contact on a transom and a battery contact on a door are connected when the door is in its closed or open position, induced current is generated from a primary circuit on the transom to a secondary circuit on the door by electro-magnetic induction when the door is in its closed or open position, or electric current is generated by a generator mounted to the door by utilizing the closing and opening movements of the door.

10 Claims, 6 Drawing Sheets

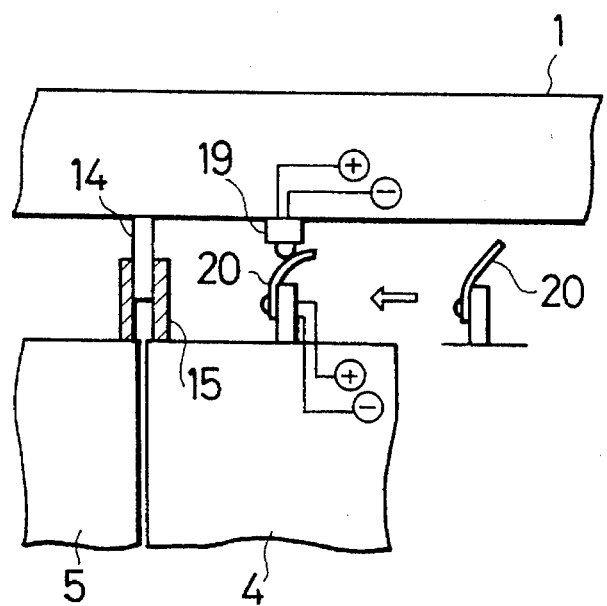
FIG.4
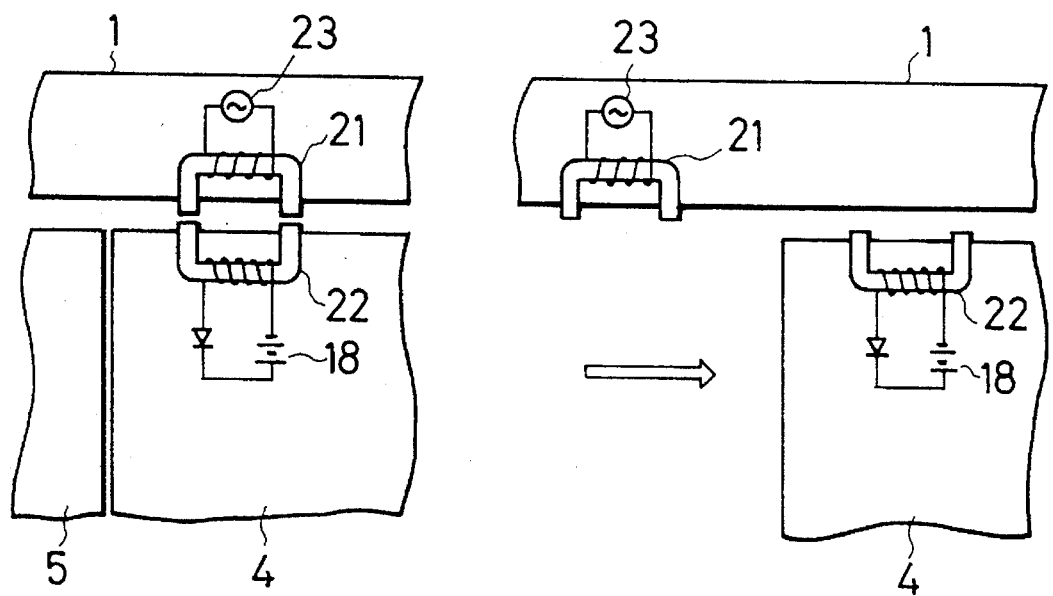
FIG.5A
FIG.5B

TO SENSOR

TO SENSOR

POWER SUPPLY DEVICE FOR CONTROLLING AUTOMATIC DOOR

BACKGROUND OF THE INVENTION

1. Field of the Invention

The present invention relates to a power supply device for supplying an electric power to sensors and a control device mounted to an automatic door so as to ensure a safe operation of the automatic door.

2. Description of the Related Art

A general construction of an automatic door, for example, double doors, is illustrated in FIG. 1. Doors 4 and 5 are suspended from a transom (base) 1 fixed to a building side through slide rollers 2, 2 and 3, 3, and pulleys 6 and 7 are pivotally supported at both ends of the transom 1 so as to extend a belt 8 therebetween. A lower part and an upper part of the belt 8 are respectively engaged with the doors 4 and 5 and the pulley 6 is rotationally driven by a motor unit 9, thereby opening and closing the doors 4 and 5. The movement of the doors 4 and 5 is controlled by a sensing signal of a touch switch 10 or a proximity switch.

In a case in which the doors 4 and 5 are respectively opened and closed under the control of a movable sensor attached to the door, such as the above touch switch 10, it is required to use a helical cord 12 as used in a telephone and further to bring the sensor in contact with a trolley wire 11 in the same manner as a trolley train in order to supply an electric power from a power source 13 to the sensor such as the touch sensor 10. However, the trolley wire 11 is apt to be damaged since the frequency of the opening and closing of the doors 4 and 5 is very high. A method of solving the above problem is disclosed in Japanese Utility Model Publication (KOKOKU) No. 28835/1988. In this method, a door is provided with a battery, and an oscillator mounted to the door which transmits a signal from a touch switch such as a light signal to a photo-sensitive control device in a transom, thereby controlling the movement of the door. In this case, it is not necessary to supply electric power from an outer power source. However, since the amount of the electric power consumed is large, in consideration of safety, it is necessary to increase the capacity of the battery or frequently replace batteries.

SUMMARY OF THE INVENTION

In view of the above problems, it is an object of the present invention to provide a power supply device for a sensor which is mounted to an automatic door and can be used for a relatively long time without any wire linking an outside power source and the movable door for power supply.

According to one aspect of the present invention, there is provided a power supply device for automatic door control in which a first contact portion connected to an outside power source is mounted on a transom for suspending a door therefrom, the door is provided with a secondary power source to be charged by the outside power source and a second contact portion connected to the first contact portion of the transom, and the first and second contact portions are connected when the door is in the closed or open position so as to supply power to the secondary power source.

According to another aspect of the present invention, there is provided a power supply device for automatic door control in which a primary circuit and a secondary circuit for supplying an electric power are respectively mounted in a transom and a door to be opposed to each other when the door is in its closed or open position, and the electric power is supplied to a secondary power source mounted in the door by an electromotive force of the secondary circuit induced by the primary circuit.

According to the other aspect of the present invention, there is provided a power supply device for automatic door control in which a generator and a secondary power source are mounted to a door, the generator is driven by the rotation of a roller for sliding the door or the movement of the door relative to a rail of a transom, thereby charging the secondary power source when the door is opened and closed.

In the first contact method among the above methods, since an electric power is supplied to a secondary power source such as a battery on the side of a door in correlation to the switch operation between the contact portions in a predetermined position of the door, no wire for power supply which follows the movement of the door is necessary. Consequently, the above-mentioned wire trouble does not occur. The second electro-magnetic induction method supplies electric power from a primary circuit in a transom to a secondary circuit through an electro-magnetic field when a door is in a predetermined position, and therefore, the above mentioned wire for power supply is also unnecessary. Furthermore, the third method using a generator solves the above problems by providing a door itself with a power supply.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a view of a variation of the structure shown in FIG. 3;

FIGS. 5A and 5B are views of another embodiment of the present invention using the electro-magnetic induction method to which the principle of a transformer is applied, FIG. 5A is a view showing the state in which doors are closed, and FIG. 5B is a view showing the state in which the doors are opened;

DESCRIPTION OF THE PREFERRED EMBODIMENTS

Embodiments of the present invention will now be described with reference to the drawings.

Figure 1:
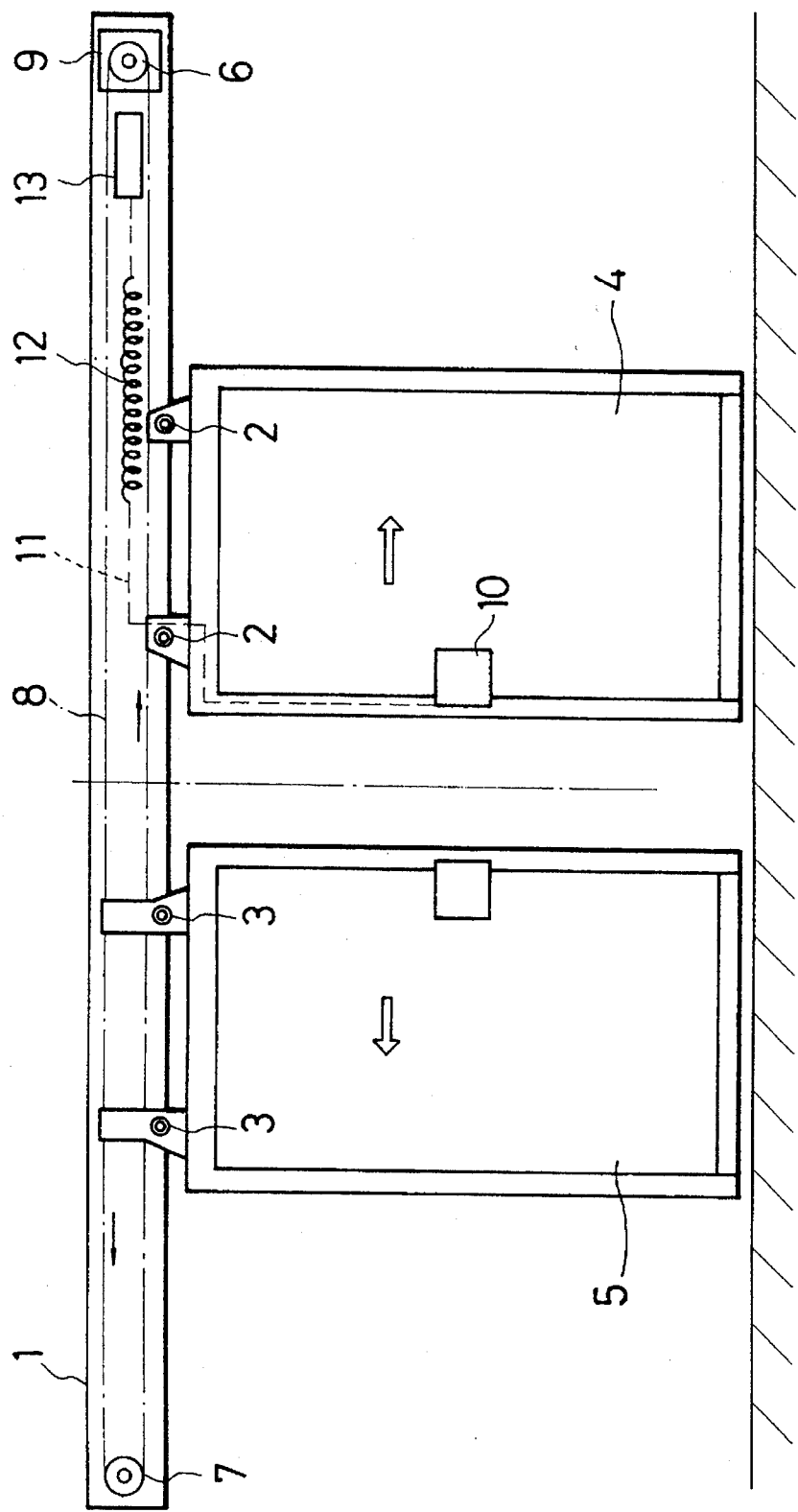
FIG. 1 is a view showing the structure of a conventional automatic door.
Figure 2:
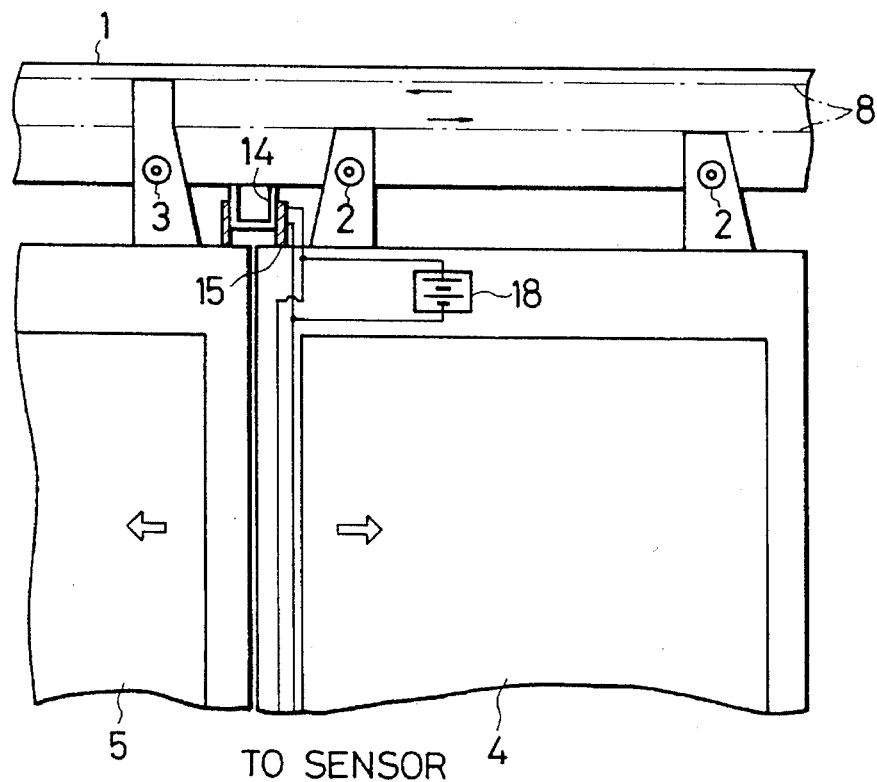
FIG. 2 is a view of an embodiment of the present invention using a contact switch.
Figure 3:
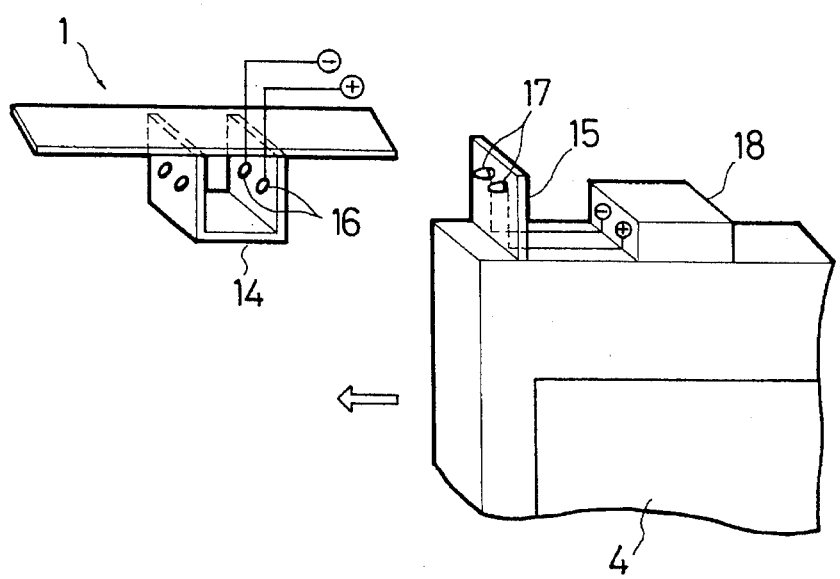
FIG. 3 is a perspective view showing a structure of a contact portion in FIG. 2.

FIG. 2 is a schematic view of an embodiment of the present invention using a contact switch, and FIG. 3 is a perspective view showing the structure of a contact portion in FIG. 2. Referring to FIG. 2, a door opening and closing mechanism is the same as the conventional one shown in FIG. 1. A U-shape stopper 14 and a plate stopper 15 are, as shown in FIGS. 2 and 3, respectively mounted to a transom 1 and a door 4 as stoppers for closing the doors 4 and 5. The U-shape stopper 14 has socket-shaped plus and minus contacts 16 connected to an outside DC power source (not shown), and the plate stopper 15 has plug-shaped plus and minus contacts 17 connected to a battery 18 as a secondary power source for actuating a sensor attached to the door 4. When the door 4 is closed at a normal state, the plate stopper 15 is brought into contact with the plate stopper 14, thereby connecting the contacts 16 and 17 so as to supply an electric power to charge from the outer power source to charge the battery 18. The battery 18 supplies the electric power to the sensor attached to the door 4.

The above means are similarly applicable to a door 5. Though the contacts 16 and 17 are respectively mounted to the stoppers 14 and 15 in the embodiment shown in FIGS. 2 and 3, it is not always necessary to mount the contacts to the stoppers if the contacts of the transom and the door are connected to each other when the door is closed or opened. For example, as shown in FIG. 4, contacts 19 and 20 using plate springs or the like may be mounted apart from the stoppers 14 and 15 so as to be connected to each other when the door is closed or opened.

FIGS. 5A and 5B are views of another embodiment of the present invention using the electro-magnetic induction method to which the principle of a transformer is applied. FIGS. 5A and 5B respectively illustrate the states when the doors are closed and opened. A transformer is divided into a primary coil 21 on a transom 1 and a secondary coil 22 on a door 4. When the door 4 is in its closed position, both the coils 21 and 22 form a single transformer. In other words, electric power of an outer AC power source 23 is supplied to the secondary coil 22 through a formed circular core as shown in FIG. 5A, and rectified by a diode as a rectifier so as to be fed to a battery 18. The rectifier may be a diode bridge. When the door 4 is opened, the above transformer is not formed as shown in FIG. 5B. To the contrary, the above transformer may be formed when the door is opened.

Figure 6:
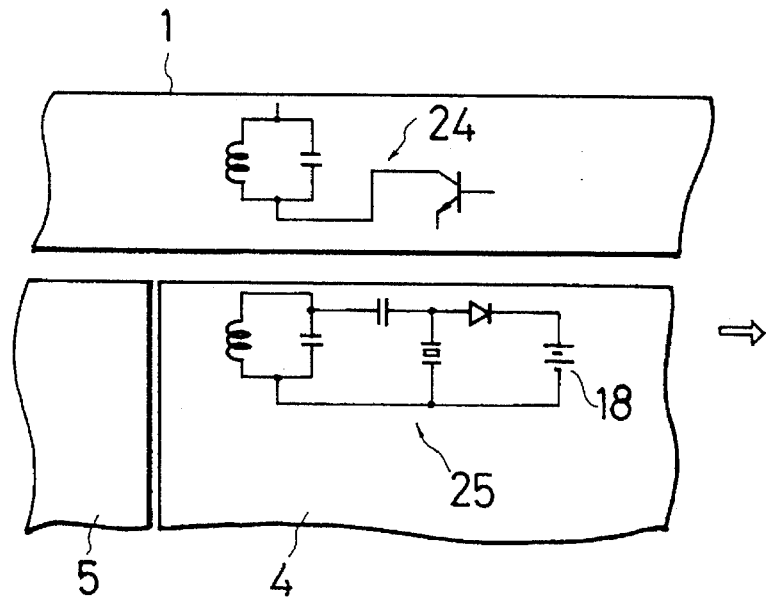
FIG. 6 is a view of a further embodiment of the present invention using a high frequency.

Though the power supply may be of a commercial frequency as in the above embodiment, it is only necessary to make the frequency higher in order to make the power more likely to be induced. If the amount of electric power consumed on the side of the door is allowed to be small, a high frequency can be used. FIG. 6 illustrates a further embodiment of the present invention using a high frequency. A primary circuit 24 for generating a high frequency is mounted to a transom 1, and a secondary circuit 25 for resonating in tune with the generated frequency is mounted to a door 4. When the door 4 is in its closed position, induced current is generated in the secondary circuit 25. After detecting the induced current, a battery 18 is charged. Furthermore, the current may be induced in the secondary circuit 25 not when the door 4 is not closed, but open.

Figure 7:
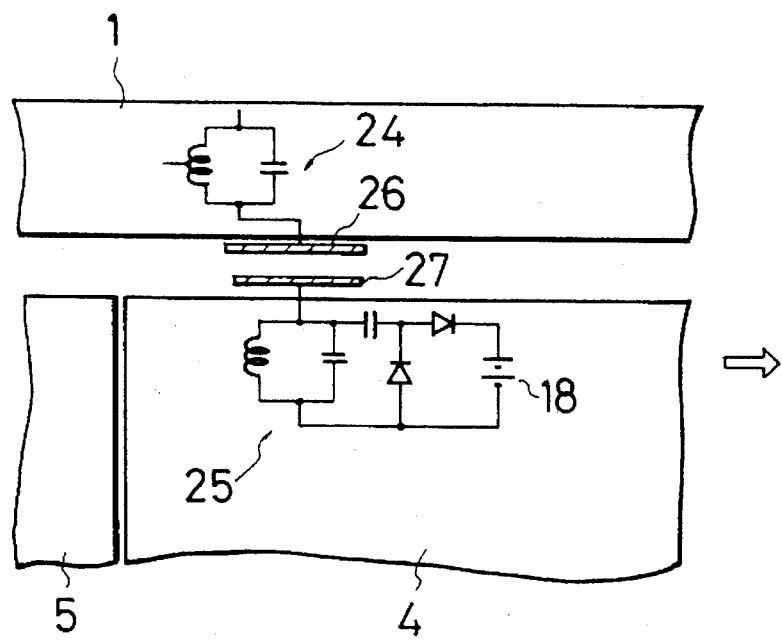
FIG. 7 is a view of a further embodiment of the present invention using electrostatic induction.

Electrostatic induction may also be utilized. In this case, as shown in FIG. 7, a primary circuit 24 on a transom 1 is a tank circuit having an electrode 26, and a secondary circuit 25 on a door 4 is a tuning circuit having an electrode 27 which is opposed to the electrode 26 when the door 4 is closed. Electrostatic induction current flowing in the secondary circuit 25 when the door 4 is closed is supplied to a secondary battery 18. In this case, the above electrostatic induction may also be raised when the door is open.

Figure 8:
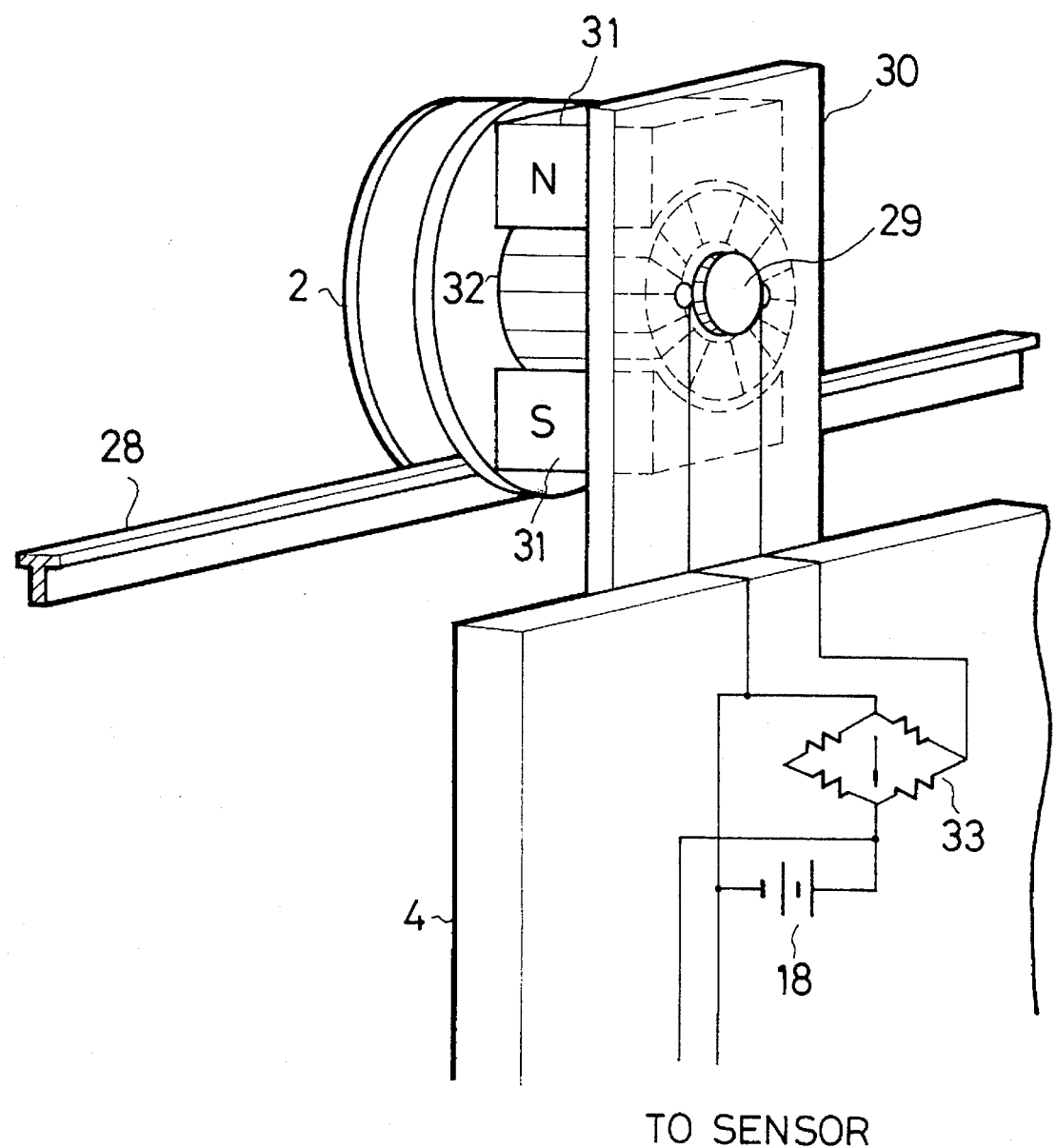
FIG. 8 is a still further embodiment of the present invention in which a generator is mounted to a door.

FIG. 8 illustrates a still further embodiment of the present invention in which a generator is mounted to a door 4. The door 4 is suspended from a fixed shaft 29 of a roller 2 rotating along a rail 28 through a hanger 30. A generator is constituted by an armature 32 fixed to the hanger 30 and magnetic poles 31 fixed to the roller 2, and generates an electric power by rotating the magnetic poles 31 together with the roller 2 around the armature 32 when the door 4 is opened and closed. A generated direct current is taken out from the fixed shaft 29, rectified by a bridge 33 and directly used as a power supply for a switch (a switch needed while the door is moving, for example, a cutout switch and so on), or stored in a battery 18 to be used.

A variation similar to a generator for a lamp of a bicycle is applicable which is fixed to the door and in which a rotating portion is rotated by a pinch roller or the like in pressed contact with a rail of a transom.

Figure 9:
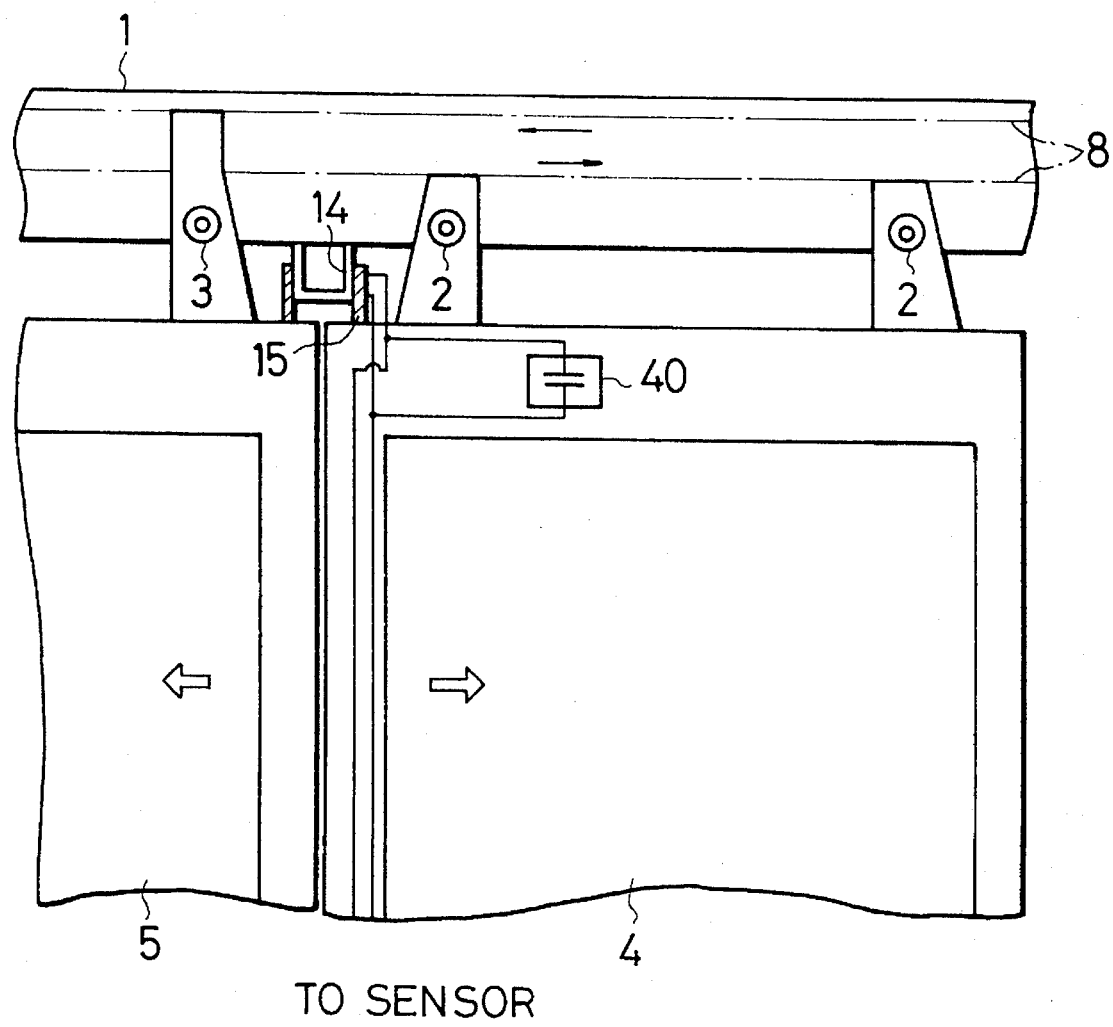
FIG. 9 is a view of another embodiment of the present invention using a high-capacity condenser for the secondary power source.

Although the above stated embodiments use a battery for a secondary power source, they may use a high-capacity condenser. FIG. 9 illustrates another embodiment used a high-capacity condenser 40 corresponding to FIG. 2. The high-capacity condenser 40 may be one condenser or plural combined condensers.

As described above, since a power supply device of the present invention needs no wire which follows the movement of the door so as to supply an electric power from an outside power source to a battery or a high-capacity condenser on the door, it does not cause any trouble even in frequency opening and closing operations of the door, and can be used over a long period of time.

It should be understood that many modifications and adaptations of the invention will become apparent to those skilled in the art and the invention is intended to encompass such obvious modifications and changes in the scope of the claims appended hereto.

What is claimed is:

1. A power supply device for automatic door control, wherein a first contact portion connected to an outside power source is mounted on a transom for suspending a door therefrom, said door is provided with a secondary power source to be charged by said outside power source and a second contact portion wherein said first and second contact portions are connected to each other when said door is closed or opened so as to supply power to said secondary power source, wherein said first contact portion is a stopper having socket-shaped plus and minus contacts and said second contact portion is a stopper having plug-shaped plus and minus contacts.

2. A power supply device for automatic door control as claimed in claim 1, wherein said secondary power source is a battery.

3. A power supply device for automatic door control as claimed in claim 1, wherein said secondary power source is a high-capacity condenser.

4. A power supply device for automatic door control, wherein a first contact portion connected to an outside power source is mounted on a transom for suspending a door therefrom, said door is provided with a secondary power source to be charged by said outside power source and a second contact portion wherein said first and second contact portions are connected to each other when said door is opened or closed so as to supply power to said secondary power source, wherein said first contact portion comprises a first plate stopper and contacts which are respectively mounted on the transom, and said second contact portion comprises a second plate stopper and spring plate contacts which are respectively mounted on the door.

5. A power supply device for automatic door control, comprising;

a primary circuit mounted on a transom, a secondary circuit mounted on a door, wherein said primary and secondary circuits are opposed to each other when said door is opened or closed, and an electric power is supplied to a secondary power source mounted to said door by an electro-motive force of said secondary circuit induced by said primary circuit, a sensor mounted on said door which receives electric power from said secondary power source, and means whereby said sensor controls the movement of said door.

6. A power supply device for automatic door control as claimed in claim 5, wherein said primary circuit and said secondary circuit are a separated-type transformer, and said secondary circuit includes a rectifier to generate a DC power.

7. A power supply device for automatic door control as claimed in claim 5, wherein said secondary power source is a battery and said rectifier is a diode.

8. A power supply device for automatic door control as claimed in claim 5, wherein said primary circuit generates a high frequency and said secondary circuit resonates in tune with the generated high frequency.

9. A power supply device for automatic door control, wherein a primary circuit and a secondary circuit for supplying an electric power are respectively mounted to a transom and a door to be opposed to each other when said door is opened or closed, wherein electric power is supplied to a secondary power source mounted to said door by an electro-motive force of said secondary circuit induced by said primary circuit, wherein said primary circuit and said secondary circuit have electrodes which when opposed to each other utilize electrostatic induction.

10. A power supply device for automatic door control, wherein a generator and a secondary power source connected to said generator are mounted to a door, and said generator is driven by the rotation of a roller which rotation is caused by the movement of said door relative to a rail of a transom, thereby charging said secondary power source when said door is opened and closed.

* * * * *